United States Patent
Flinta et al.

(10) Patent No.: US 8,861,399 B2
(45) Date of Patent: Oct. 14, 2014

(54) NETWORK NODE

(75) Inventors: Christofer Flinta, Stockholm (SE); Jan-Erik Mangs, Solna (SE); Bob Melander, Sigtuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 112 days.

(21) Appl. No.: 13/129,161

(22) PCT Filed: Nov. 14, 2008

(86) PCT No.: PCT/SE2008/051316
§ 371 (c)(1),
(2), (4) Date: May 13, 2011

(87) PCT Pub. No.: WO2010/056170
PCT Pub. Date: May 20, 2010

(65) Prior Publication Data
US 2011/0228791 A1  Sep. 22, 2011

(51) Int. Cl.
*H04L 12/28* (2006.01)
*H04L 12/26* (2006.01)
*G06F 15/177* (2006.01)
*H04L 29/12* (2006.01)

(52) U.S. Cl.
CPC ...... *H04L 29/12273* (2013.01); *H04L 61/2053* (2013.01); *H04L 29/12226* (2013.01); *H04L 61/2015* (2013.01)
USPC ............ 370/254; 370/401; 370/252; 709/221

(58) Field of Classification Search
None
See application file for complete search history.

(56) References Cited

U.S. PATENT DOCUMENTS

| | | | | |
|---|---|---|---|---|
| 6,118,768 | A * | 9/2000 | Bhatia et al. | 370/254 |
| 7,039,688 | B2 * | 5/2006 | Matsuda et al. | 709/220 |
| 7,590,129 | B2 * | 9/2009 | Absillis | 370/401 |
| 8,040,819 | B2 * | 10/2011 | Harrington et al. | 370/254 |
| 8,223,631 | B2 * | 7/2012 | Yasrebi et al. | 370/221 |
| 2006/0136567 | A1 | 6/2006 | Muramatsu et al. | |
| 2007/0171884 | A1 * | 7/2007 | Irie et al. | 370/338 |
| 2009/0019536 | A1 * | 1/2009 | Green et al. | 726/12 |
| 2009/0222537 | A1 * | 9/2009 | Watkins et al. | 709/221 |

OTHER PUBLICATIONS

DSL Forum: "Auto-Configuration for Basic Internet (IP-based) Services" Technical Report TR-044, [Online] Dec. 11-14, 2001, XP002562235 Retrieved from the Internet: URL:http://www.broadband-forum.org/technical/download/TR-044.pdf> [retrieved on Jan. 8, 2010].

* cited by examiner

*Primary Examiner* — Hassan Phillips
*Assistant Examiner* — Hicham Foud

(57) ABSTRACT

A network node is arranged to provide an end user of a network terminal in a network with an access link to an external network including at least one external network interface, a control unit, and at least one internal network interface, the network node being arranged to be connected between the network and the external network. The network node is characterized in that the control unit is arranged to deactivate and re-activate the at least one internal network interface towards the network terminal in the network in order to trigger a dynamic host configuration protocol request from the network terminal such that a new Internet Protocol configuration can be established for the network terminal. A method for use in a network node and a computer program product are also disclosed herein.

11 Claims, 5 Drawing Sheets

NETWORK NODE

TECHNICAL FIELD

The invention relates, in general, to a network node and, in particular, to a network node arranged to provide a network terminal in a local area network (LAN) with an access link to an external network.

BACKGROUND

A network node as referred to herein may be implemented in various types of network environments such as in company networks, office networks, residential networks, etc., for providing access to external networks, such as, the Internet or other interconnecting networks. However, the functionality of the network node may most fittingly be described in reference to a residential gateway implemented in a residential network.

A residential gateway is a kind of network equipment found in most homes today. The residential gateway, also referred to as home gateway, is a hardware device connecting a home network to external networks, for example, a wide area network (WAN) such as the Internet.

A residential gateway may combine the functions of an IP router, multi-port Ethernet switch and WiFi access point. It may also provide port translation functionality (NAT), support for localized Quality of Service (QoS) enforcement and also serves as a dynamic DNS client, etc. The residential gateway may be arranged between a modem and the residential network, or an xDSL or cable modem may be integrated into the residential gateway. Thus, the residential gateway has a connection, such as, an Ethernet connection or xDSL connection, which it may use to connect to the external networks, WANs or the Internet.

In some instances, a network terminal that is connected to a residential gateway may end up not having established correct IP configurations. This may occur, for example, when a residential gateway, which comprises a switch providing external network access, performs a change to a different internet service provider (ISP). It may also occur, for example, when a network terminal in a residential network has been unsuccessful in trying to establish an IP configuration.

SUMMARY

A problem to which the invention relates is the problem of providing a network terminal with an IP configuration.

The invention relates to a network node arranged to provide an end user of a network terminal in a internal network with an access link to an external network comprising at least one external network interface, a control unit, and at least one internal network interface, said network node being arranged to be connected between said internal network and said external network, characterized in that said control unit is arranged to deactivate and reactivate said at least one internal network interface towards said network terminal in said internal network in order to trigger a dynamic host configuration protocol request from said network terminal such that a new IP configuration can be established for said network terminal.

The invention also relates to a method for use in a network node providing an end user of a network terminal in a internal network with an access link to an external network, said network node being arranged between said internal network and said external network, characterized by the steps of: detecting a need for providing said network terminal in said internal network with a new IP configuration; upon detecting said need of a new IP configuration, deactivating at least one internal network interface in said network node towards said network terminal; and re-activating said at least one internal network interface in order to trigger a DHCP request from said network terminal such that a new IP configuration can be established for said network terminal.

The invention further relates to a computer program product for use in a network node in a internal network, which comprises computer readable code means, which when run in a control unit in the network node causes said control unit to perform the steps of: detecting a need for providing a network terminal in said internal network with a new IP configuration; upon detecting said need of a new IP configuration, deactivating at least one internal network interface in said network node towards said network terminal; and re-activating said at least one internal network interface in order to trigger a DHCP request from said network terminal such that a new IP configuration can be established for said network terminal.

By having a network node arranged according to the above, the network node is provided with a mechanism for automatically triggering a network terminal to send out a new dynamic host configuration protocol (DHCP) request without end user intervention. Thus, the network terminal may always be provided with a correct IP configuration. Also, this advantageously enables IP reconfigurations of one or a plurality of network terminals to be automatically performed by the network node.

The network node may also be arranged to perform said deactivation and re-activation upon detecting a need for providing the network terminal in the internal network with a new IP configuration. This feature enables the network node to upon, for example, detecting that the access link to the external network has switched from one ISP with one IP address domain to another ISP with another IP address domain, trigger the network terminal to send a new DHCP request in order to establish a new IP configuration belonging to the new ISPs IP address domain.

The detection above may be performed by the network node, for example, if a DHCP request has not be received from the network terminal for a predetermined period of time. This feature enables the network node to handle situations such as, for example, when the network terminal in the internal network has been unsuccessful in trying to establish an IP configuration and therefore have timed out.

The detection above may further be performed by receiving an IP reconfiguration signal over the at least one external network interface in the network node. This feature enables the automatic DHCP request triggering of the network node described above to be remotely triggered over the access link to the external network. In this way, an ISP, online support function or the like may remotely trigger the network node to automatically trigger the network terminal to send a new DHCP request to the network node in order to establish a new IP configuration.

The network node may further be arranged to repeat the deactivation and re-activation of the internal network interface towards the network terminal for a predetermined number of times, if a request previously has not been triggered. This may, for example, be advantageous in situations where the network terminal is busy processing other events at the specific point in time when a deactivation and re-activation is performed.

Further advantageous embodiments of the network node, the method and the computer program product are set forth in the dependent claims, which correspondingly describe further advantageous embodiments of the invention.

BRIEF DESCRIPTION OF THE DRAWINGS

The invention will be described in more detail in the following with reference to the appended drawings, in which.

DETAILED DESCRIPTION

Figure 1:
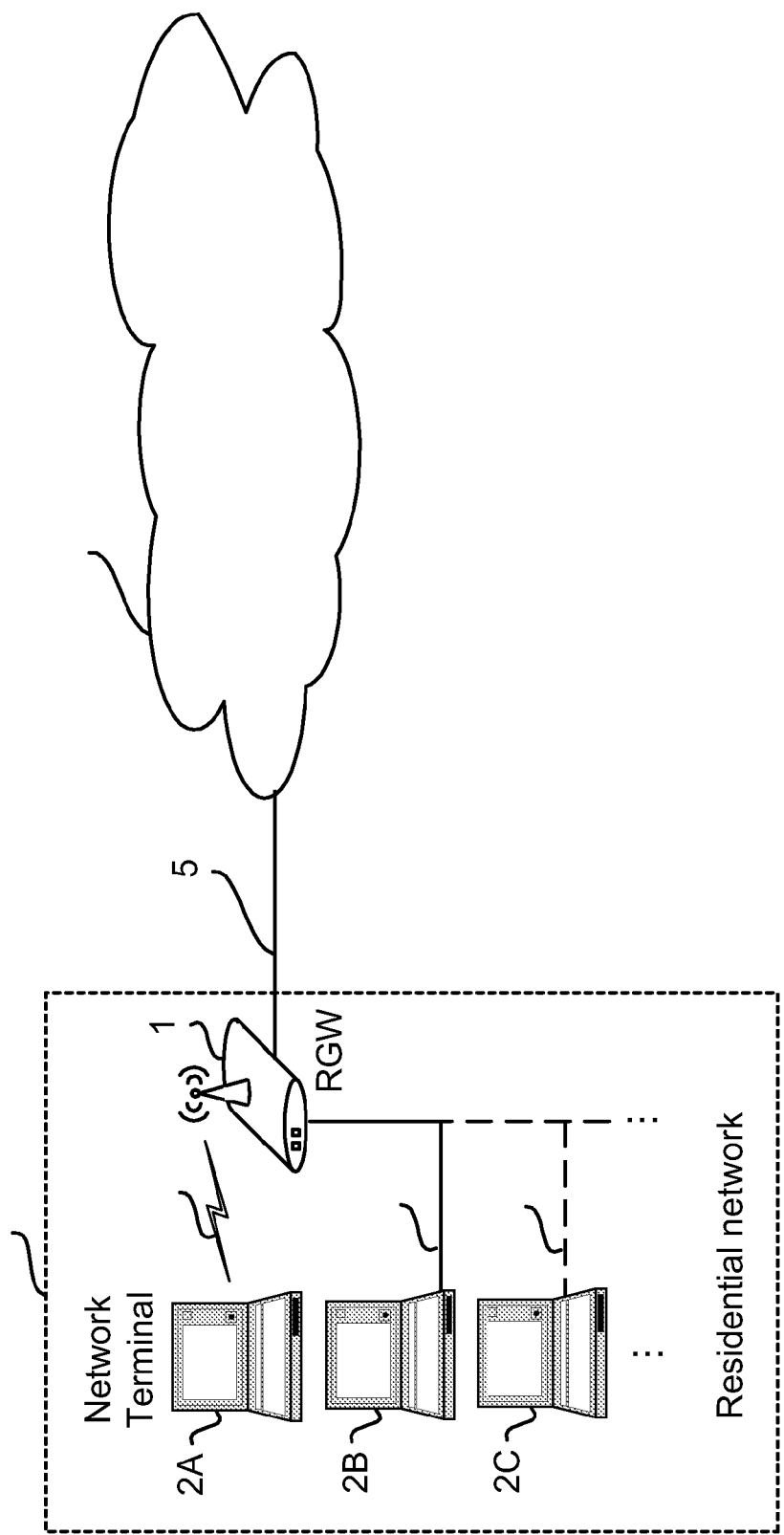
FIG. 1 shows a network node connecting an internal network to an external network.

The functionality of the network node according to the invention is most fittingly described in reference to a residential gateway implemented in a residential network, as shown in FIG. 1, but it should be noted that the network node according to the invention may be implemented in or connected to various different types of network environments, such as, for example, company networks, office networks, etc. The network node according to the invention may be thus be arranged to provide said internal network with an access link to external networks, such as, for example, the Internet or other interconnecting networks.

FIG. 1 shows a residential gateway (RGW) 1 connecting a residential network 3 to an external network 6. In FIG. 1, a residential gateway 1 is located in a residential network 3. The residential gateway 1 may comprise a xDSL or cable modem, or may be arranged between the residential network 3 and a modem (not shown). The modem provides a connection 5 for the residential gateway 1 to an external network 6, e.g. the Internet.

The residential network 3 may comprise at least one network terminal 2A, 2B, 2C. The residential gateway 1 is arranged to communicate with the at least one network terminal 2A, 2B, 2C over at least one connection 4A, 4B, 4C. The at least one connection 4A, 4B, 4C may be a wireless connection 4A (e.g. WiFi) or a wired connection 4B, 4C (e.g. Ethernet cable). The residential gateway 1 may thus provide an access link to the external network 6 for the at least one network terminal 2A, 2B, 2C in the residential network 3 over the connection 5.

Figure 2:
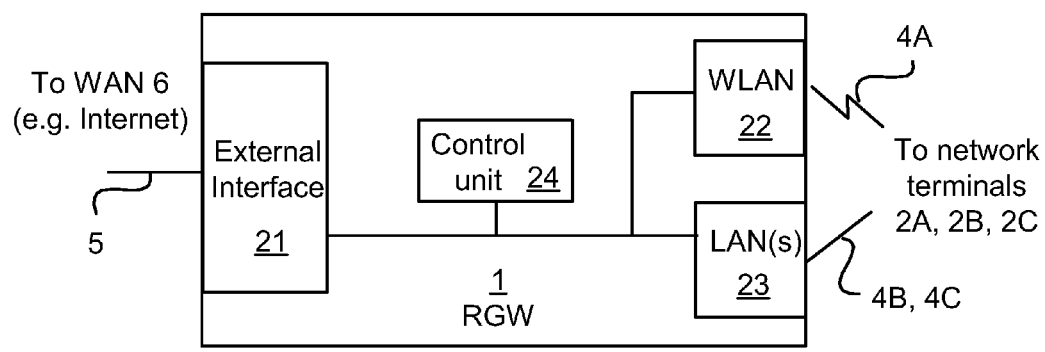
FIG. 2 illustrates a network node according to an exemplary embodiment of the invention.

FIG. 2 illustrates a residential gateway 1 according to an exemplary embodiment of the invention. The residential gateway 1 comprises at least one external interface 21 for providing a connection 5 to an external network 6, such as, for example, a WAN or the Internet. The external interface 21 may comprise a xDSL or cable modem, or may be arranged to be connected to an external modem (not shown). The external interface 21 may be connected to at least one internal interface 22, 23 in the residential gateway 1, which also may be referred to as a residential network interface. The at least one internal interface 22, 23 may be, for example, a Wireless-LAN (WLAN) interface 22 for connecting the residential gateway 1 to one or several network terminals 2A, 2B, 2C over a wireless connection 4A, and/or an local area network (LAN) interface 23 for connecting the residential gateway 1 to a network terminal 3 over a wired connection 4B, 4C. The wired connection 4B, 4C may be established using, for example, an Ethernet cable. It should also be noted that the at least one external interface 21 and the at least one internal interface 22, 23 may be implemented in a shared unit or be parts of the same interface.

Figure 3:
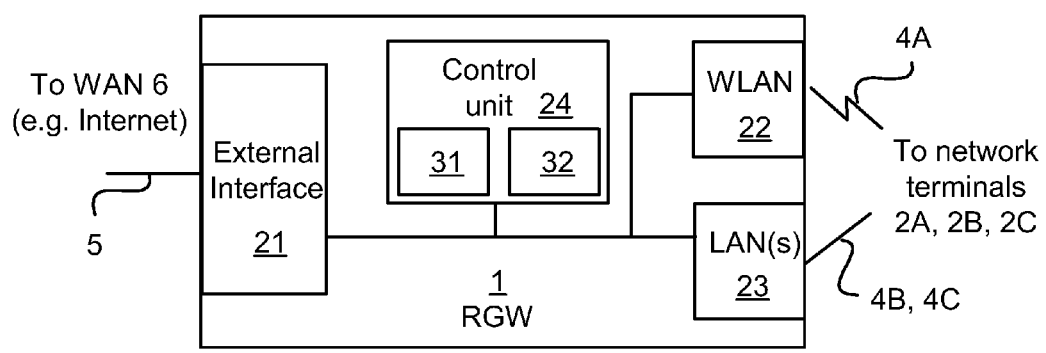
FIG. 3 illustrates a network node according to another exemplary embodiment of the invention.

Furthermore, the residential gateway 1 comprises a control unit 24. The control unit 24 may be connected to the external interface 21 and the at least one internal interface 22, 23. As shown in FIG. 3, the control unit 24 may comprise timing means 31, such as, for example, a clock, a timer or the like, and counting means 32, such as, for example, a counter or the like. The control unit 24 may also be arranged to receive information from the external network 6 through the external interface 21.

It should be noted that the control unit 24 comprises logic for performing the functionality of the residential gateway 1. This functionality may be described as comprising the functionality of, for example, a cable modem, a DSL modem, a router, a wireless router, a switch, a VoIP ATA device, a wireless access point or any combination of the above or the like. The functionality of the residential gateway 1 may be implemented by means of a software or computer program. The control unit 24 may also comprise storage means or a memory unit for storing the computer program and processing means or a processing unit, such as a microprocessor, for executing the computer program. The storage means may also be readable storage medium separated from the control unit 24, but be connected to the control unit 24. When, in the following, it is described that the residential gateway 1 performs a certain function it is to be understood that the control unit 24 in the residential gateway 1 may use the processing means to execute a certain part of the program which is stored in the storage means in order to perform said function.

Figure 4:
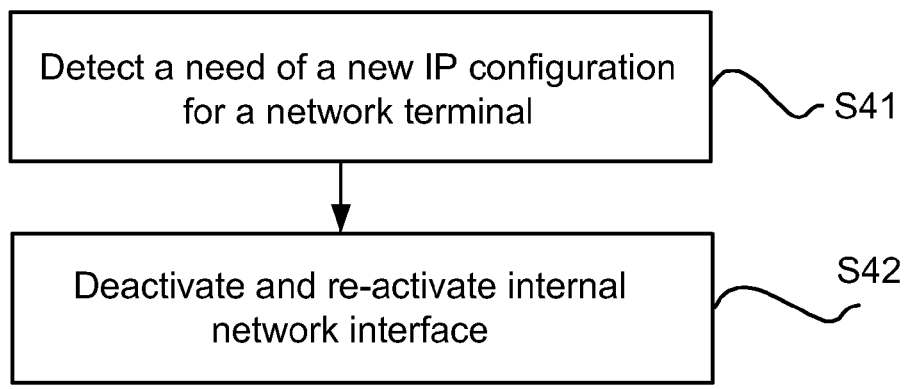
FIG. 4 is a flowchart illustrating a method according to an exemplary embodiment of the invention.

FIG. 4 is a flowchart illustrating an exemplary embodiment of the invention. In step S41, the residential gateway 1 may detect a need for providing a network terminal 2A, 2B, 2C in the residential network 3 with a new IP configuration.

This may be performed by, for example, the residential gateway 1 detecting a change/switch of the IP network in the residential network 3, or detecting that the access link to the external network 6 has switched from one ISP with one IP address domain to another ISP with another IP address domain. The latter may be advantageous in a situation where the residential gateway 1 is a switch and receives its IP address directly from the ISP. If the access link to the external network provided by the first ISP is switched to another access link belonging to the other ISP, then the network terminal 2A, 2B, 2C has to be provided with a new IP address belonging to the new ISP. Normally, the network terminal 2A, 2B, 2C is unaware of that the access link to the external network 6 has been switched and will therefore not request a new IP configuration.

In step S42, the residential gateway 1 may deactivate and reactivate the internal network interface 22, 23 towards the network terminal 2A, 2B, 2C. This may be performed in order to trigger a DHCP request from the network terminal 2A, 2B, 2C such that a new IP configuration can be established for the network terminal 2A, 2B, 2C.

Figure 5:
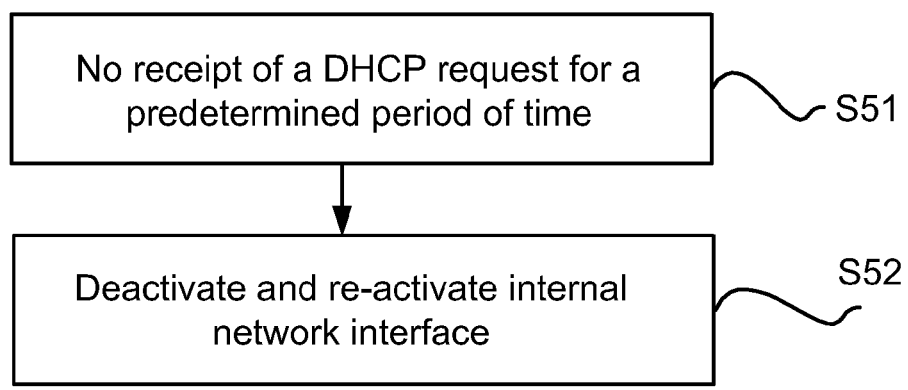
FIG. 5 is a flowchart illustrating a method according to another exemplary embodiment of the invention.

FIG. 5 is a flowchart illustrating another exemplary embodiment of the invention. In step S51, the residential gateway 1 may detect a need for providing a network terminal 2A, 2B, 2C in the residential network 3 with a new IP configuration by not having received a DHCP request from the network terminal 2A, 2B, 2C in the residential gateway 1 for a predetermined period of time. This may, for example, be performed by the control unit 24 in the residential gateway 1 setting a timer for a predetermined period of time. If no DHCP request has been received upon the expiry of the predetermined period of time, step S52 is performed. The timer may be initiated by the control unit 24, for example, upon starting up the residential gateway 1 or be triggered by another event in the residential gateway 1, such as, for example, any of the detection events mentioned in the previous embodiment in reference to step S41. Step S52 is identical to the step S42 described in the previous embodiment.

This embodiment enables the residential gateway 1 to handle situations such as, for example, when the network terminal 2A, 2B, 2C in the residential network 3 has been unsuccessful in trying to establish an IP configuration and therefore have timed out.

Figure 6:
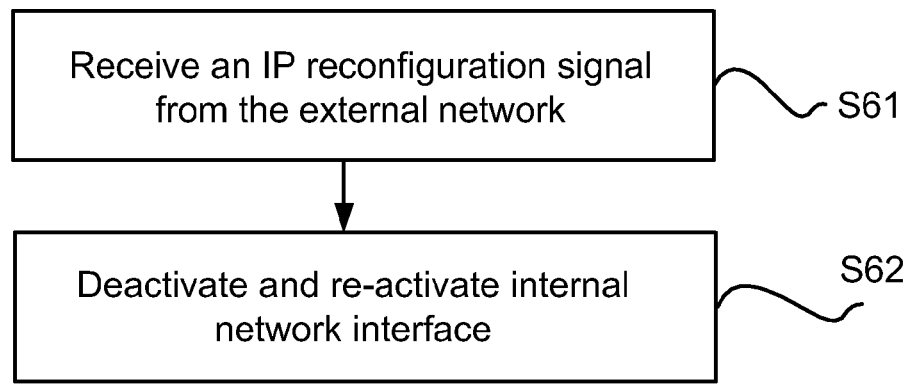
FIG. 6 is a flowchart illustrating a method according to a further exemplary embodiment of the invention.

FIG. 6 is a flowchart illustrating a further exemplary embodiment of the invention. In step S61, the residential gateway 1 may detect a need for providing a network terminal 2A, 2B, 2C in the residential network 3 with a new IP configuration by receiving an IP reconfiguration signal. The control unit 24 in the residential gateway 1 may be arranged to receive said IP reconfiguration signal from the external network 6 through the external interface 21, or over the internal interface 22, 23 (e.g. from another network terminal 2A, 2B, 2C). Alternatively, the IP reconfiguration signal may be provided to residential gateway 1 manually by, for example, the use of an input device located on the residential gateway 1. The IP reconfiguration signal may indicate to the residential gateway 1 to perform step S62. Step S62 is identical to the step S42 and S52 in the previous embodiments.

This embodiment enables an ISP, online support function or the like to remotely trigger the residential gateway 1 to automatically trigger the network terminal 2A, 2B, 2C to send a new DHCP request to the residential gateway 1 in order to establish a new IP configuration for the network terminal 2A, 2B, 2C. This may be advantageous in, for example, a situation wherein at least one set-top-box is connected to at least one residential gateway 1, and an operator of the set-top-box wishes to reconfigure the IP address of the set-top-box. This is particularly advantageous if there are a plurality of set-top-boxes connected to a plurality of residential gateways 1, since the residential gateways 1 may be triggered to automatically trigger the plurality of set-top-boxes to send new DHCP requests in order to establish new IP configurations for the plurality of set-top-boxes.

Figure 7:
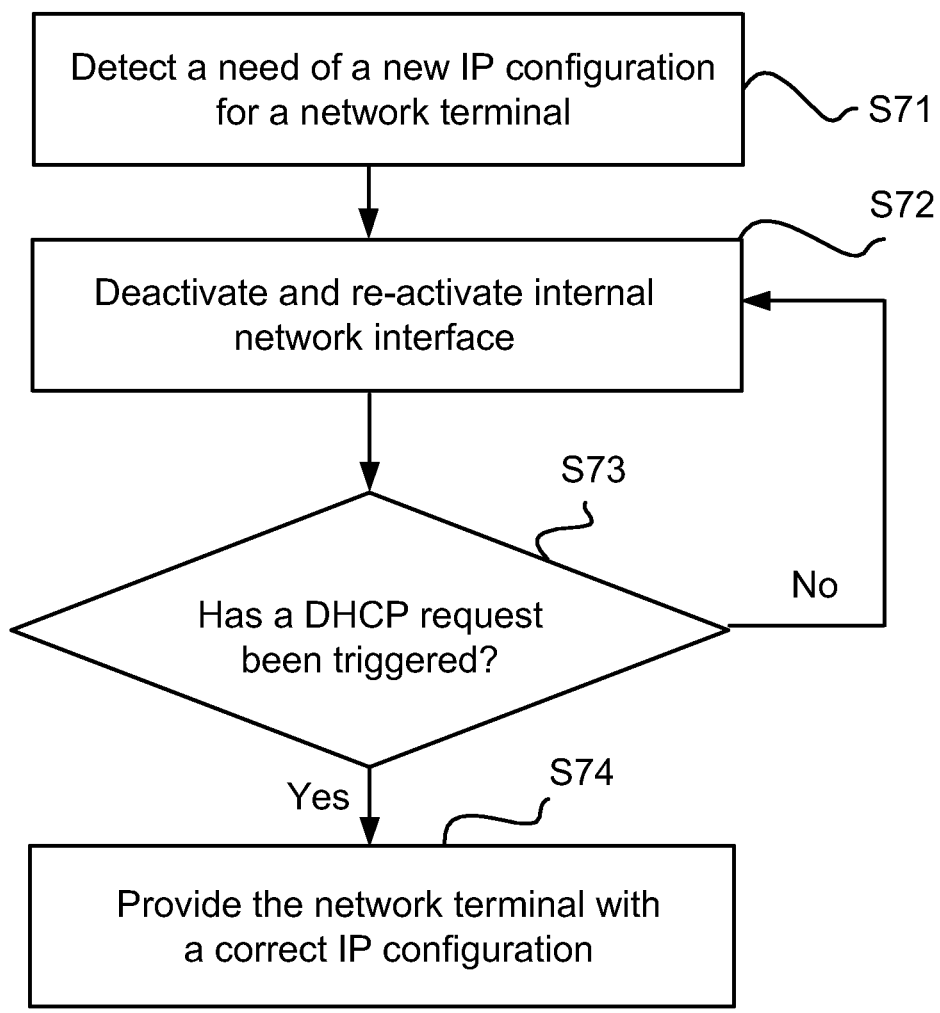
FIG. 7 is a flowchart illustrating a method according to another further exemplary embodiment of the invention.
Figure 8:
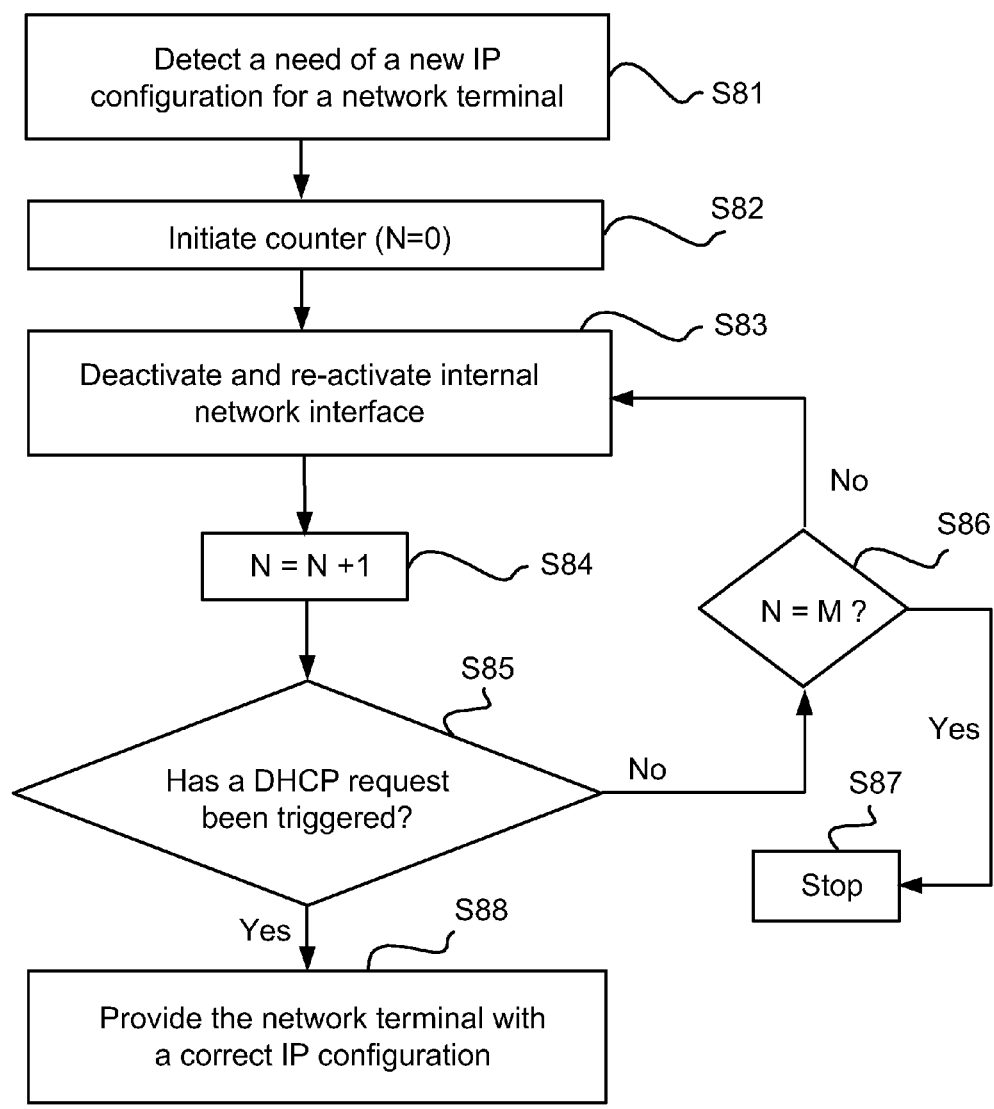
FIG. 8 is a flowchart illustrating a method according to another further exemplary embodiment of the invention.

FIGS. 7 and 8 describe flowcharts illustrating further exemplary embodiments of the invention. In these embodiments, the steps S71 and S81 may be identical to any one of the steps S41, S51 and S61 described in the previous embodiments. Steps S72 and S83 may be identical to the steps S42, S52 and S62 described in the previous embodiments.

In steps S73 and S85, if the deactivation and re-activation of the internal network interface 22, 23 results in that a DHCP request is triggered in the network terminal 2A, 2B, 2C and thereby is received by the residential gateway 1, the residential gateway 1 may in step S74 or S88, respectively, provide the network terminal 2A, 2B, 2C with a correct IP configuration. This may be performed according to the DHCP standard, IETF RFC 2131 "Dynamic Host Configuration Protocol" and IETF RFC 3315 "Dynamic Host Configuration Protocol for IPv6 (DHCPv6)". However, if the deactivation and re-activation of the internal network interface 22, 23 does not results in that a DHCP request is triggered, the residential gateway 1 may return to step S72 or S83, respectively.

As shown in FIG. 8, the deactivation and re-activation of the internal network interface 22, 23 may be repeated for a predetermined number of times, M. This may, for example, be performed according to the steps S82, S84, S86 and S87 in FIG. 8.

In step S82, a counting means, for example, the counter 32 in the control unit 24, in the residential gateway 1 may be set to 0, that is, N=0. This may also be a default value of the counter 32, wherein said step S82 may be skipped. In step S84, the counter 32 may iteratively add to the count, that is, N=N+1, for each time the deactivation and re-activation of the internal network interface 22, 23 is performed. In step S86, the residential gateway 1 may check the counting means how many times the deactivation and re-activation of the internal network interface 22, 23 has been performed. If the deactivation and re-activation of the internal network interface 22, 23 has been performed less than the predetermined number of times M, that is, N<M, then the residential gateway 1 may return to step S83. However, if the deactivation and re-activation of the internal network interface 22, 23 has been performed an equal number of times as the predetermined number of times M, that is, N=M, then the residential gateway 1 may in step S87 stop performing the deactivation and re-activation of the internal network interface 22, 23. This may be performed in order to avoid an endless loop of deactivating and re-activating the internal network interface 22, 23.

This embodiment may be advantageous in situations where the network terminal 2A, 2B, 2C is busy processing other events at the specific point in time when the deactivation and re-activation is performed by the residential gateway 1.

An advantage of the invention may be illustrated by a scenario wherein a web portal is used. The web portal may be comprised in the residential gateway 1. The web portal may, for example, assign a temporary IP configuration to the network terminal 2A, 2B, 2C, which only gives a local access to the web portal, and allow a user of the network terminal 2A, 2B, 2C to select an ISP for the access link to the external network 6. As a user selects an ISP in the web portal, the residential gateway 1 must reconfigure the IP configuration of the network terminal 2A, 2B, 2C according to the IP address domain space of the selected ISP. Instead of manually performing the reconfiguration and/or by turning off/on the residential gateway, this may be performed automatically by the residential gateway 1 according to the invention as described in the embodiments above.

Another advantage of the invention may be illustrated by a scenario wherein the residential gateway 1 is a switch comprising a WLAN. If a user wants to change the IP network for the WLAN in the switch, then the network terminal 2A, 2B, 2C has to be reconfigured. Instead of manually performing the reconfiguration and/or by turning off/on the switch, this may be performed automatically by the residential gateway 1 according to the invention as described in the embodiments above.

It should also be noted that the invention may be also advantageously be implemented for virtual machines and virtual networks. One example of when this may be applicable is, for example, if one operative system, such as, e.g. Linux or the like, is running in a virtual machine, for example, by using VMware or the like, which in turn is implemented and running on top of another underlying operative system, such as, e.g. Microsoft Windows or the like, in a physical machine. If the physical machine running the underlying operative system then is moved between two external network connections, the underlying operative system receives a new IP address after a certain period of time when the external interface has been torn down (deactivated) and then again been re-established. However, the operative system running in the virtual machine will not receive a new IP address. One reason for this may be that the virtual machine is provided with a virtual link, which is not deactivated even though the external interface of the physical machine running the underlying operative system is deactivated. Thus, the present invention as described above may here provide the virtualization software with a mechanism for automatically triggering the virtual machine to send out a new IP address request, such as, for example, a dynamic host configuration protocol (DHCP) request, in order to obtain a new IP address. That is, by deactivating and re-activating the virtual interface of the virtual machine. This may be performed when the physical machine running the underlying operative system has established a new IP configuration.

The description above is of the best mode presently contemplated for practising the invention. The description is not intended to be taken in a limiting sense, but is made merely for the purpose of describing the general principles of the invention. The scope of the invention should only be ascertained with reference to the issued claims.

The invention claimed is:

1. A network node arranged to provide a network terminal in a local area network [LAN] with an access link to an external network, comprising:
   at least one external network interface coupled to said external network;
   a control unit; and
   at least one local area network interface coupled to said network terminal, said network node being arranged between said network terminal and said external network to provide said access link therebetween;
   wherein said control unit is arranged to deactivate and re-activate said at least one local area network interface connecting said network node to said network terminal in order to trigger a dynamic host configuration protocol [DHCP] request from said network terminal such that a new Internet protocol [IP] configuration can be established for said network terminal, said control unit being arranged to perform said deactivation and re-activation upon said network node detecting a need for providing said network terminal with said new IP configuration including detecting said access link to said external network has switched from one Internet service provider [ISP] with one address domain to another ISP with another address domain.

2. The network node according to claim 1, wherein said need for providing said network terminal with said new IP configuration is further detected by not receiving a DHCP request from said network terminal for a predetermined period of time.

3. The network node according to claim 1, wherein said need for providing said network terminal with said new IP configuration is further detected by said control unit receiving an IP reconfiguration signal.

4. The network node according to claim 1, wherein said control unit is arranged to repeat said deactivation and re-activation of said at least one local area network interface towards said network terminal for a predetermined number of times if a DHCP request previously has not been triggered.

5. The network node according to claim 1, wherein said control unit is further arranged to provide said network terminal with a correct IP configuration upon receiving a DHCP request from said network terminal.

6. The network node according to claim 1, wherein said network node is a residential gateway and said local area network is a residential network.

7. A method for use in a network node being arranged between a network terminal in a local area network and an external network, comprising the steps of:
   providing said network terminal, coupled to at least one local area network interface of said network node, with an access link to said external network, coupled to at least one external network interface of said network node;
   detecting by said network node a need for providing said network terminal with a new Internet protocol [IP] configuration including detecting said access link to said external network has switched from one Internet service provider [ISP] with one address domain to another ISP with another address domain;
   upon detecting said need of said new IP configuration, deactivating said at least one local area network interface connecting said network node to said network terminal; and
   re-activating said at least one local area network interface in order to trigger a dynamic host configuration protocol [DHCP] request from said network terminal such that said new IP configuration can be established for said network terminal.

8. The method according to claim 7, wherein said detection may further be performed by the steps of:
   not receiving a DHCP request in said network node from said network terminal for a predetermined period of time; or
   receiving an IP reconfiguration signal in said network node over said at least one external network interface.

9. The method according to claim 7, further comprising the step of repeating said deactivating and re-activating of said at least one local area network interface towards said network terminal for a predetermined number of times (M), if a DHCP request previously has not been triggered.

10. The method according to claim 7, further comprising the step of providing said network terminal with said new IP configuration upon receiving a DHCP request from said network terminal.

11. A computer program product for use in a network node arranged between a network terminal in a local area network and an external network, which comprises a non-transitory computer readable medium storing computer readable code, which when run in a control unit in said network node causes said control unit to perform the steps of:
   providing said network terminal, coupled to at least one local area network interface of said network node, with an access link to said external network, coupled to at least one external network interface of said network node;
   detecting by said network node a need for providing said network terminal with a new Internet protocol [IP] configuration including detecting said access link to said external network has switched from one Internet service provider [ISP] with one address domain to another ISP with another address domain;
   upon detecting said need of said new IP configuration, deactivating said at least one local area network interface connecting said network node to said network terminal; and
   re-activating said at least one local area network interface in order to trigger a dynamic host configuration protocol [DHCP] request from said network terminal such that said new IP configuration can be established for said network terminal.

* * * * *